United States Patent [19]

Vrajich

[11] Patent Number: 4,753,014
[45] Date of Patent: Jun. 28, 1988

[54] JOIST HANGER GAGE AND HOLDING DEVICE

[76] Inventor: Nick Vrajich, 955 Felicia Way, San Luis Obispo, Calif. 93401

[21] Appl. No.: 27,603

[22] Filed: Mar. 18, 1987

[51] Int. Cl.4 .............................................. G01B 3/30
[52] U.S. Cl. ..................................... 33/613; 269/909
[58] Field of Search ........................ 33/613, 645, 644; 52/289, 702; 269/904, 909, 41

[56] References Cited

U.S. PATENT DOCUMENTS 3,350,787 11/1967 Romano ................................ 33/613
4,625,415 12/1986 Diamontis ............................ 33/613

Primary Examiner—Harry N. Haroian

[57] ABSTRACT

The joist hanger gage and holding device enables its user to position a joist hanger against the header vertically, space it horizontally, and hold it in position hands free. The inherent design of four major members, the solid jaw, movable jaw, vernier rod and horizontal spacer offer greater overall efficiency and greater personal safety regarding construction personnel hand injury over the present method of joist hanger installations.

4 Claims, 3 Drawing Sheets

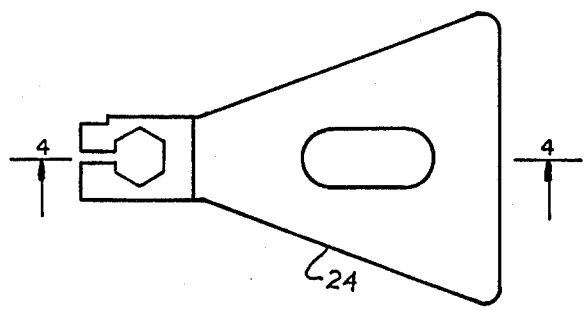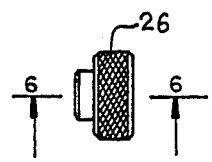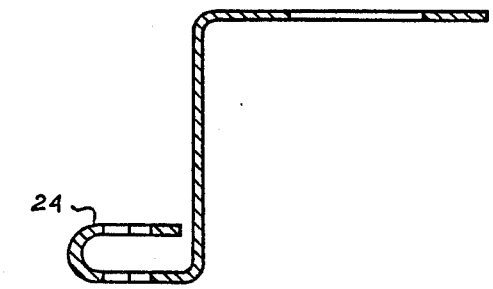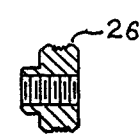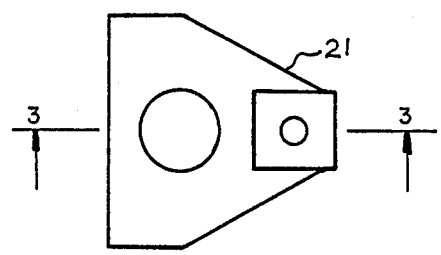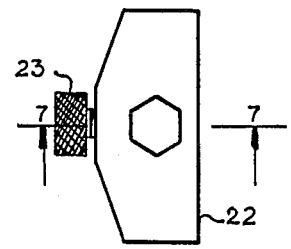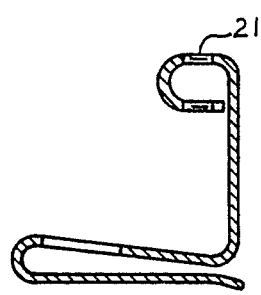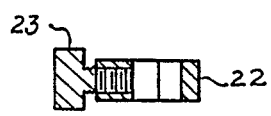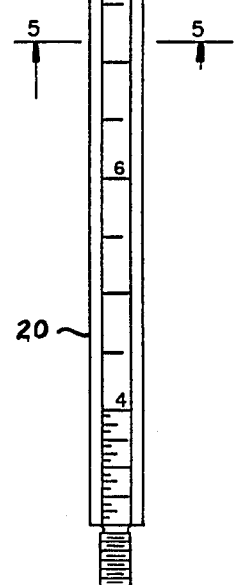

JOIST HANGER GAGE AND HOLDING DEVICE

BACKGROUND OF THE INVENTION

Present state of geotechnical requirements by the appropriate industry building code in the field of construction industry demands utilization of joist hangers between the header ledger and joist joints. Since these requirements are mandatory a number of different joist hangers are available to fill the contractor's needs. However, the efficiency in mounting joist hangers is less than desirable due to the number of obstacles each contractor has to overcome such as vertical and horizontal alignment of joist hangers in relation to header, personal safety e.g., landing a hammer blow on contractor's hand/finger while attempting to maintain the joist hanger in proper alignment and nail it to the header.

With the reference invention it is possible to accomplish the necessary task virtually effortlessly with a variety of joist and truss hanger geometric designs and sizes. Once the referenced invention is positioned on the header ledger it could be nailed virtually hands free thus avoiding hand injury.

From the production efficiency point of view considerable time savings have been noted in field testing. The present method does not provide the contractor with consistent and dimensionally repetitive values or the ease of physical adjustment/calibration as the referenced invention does. As a measuring/gaging and holding device the purpose of the referenced invention is to further enhance the joist and truss hangers utilization throughout the world wide construction industry.

SUMMARY OF THE INVENTION

The referenced invention is composed of a vernier rod 20 shown in FIG. 5. The lower end 20 is threaded for self fastening into the solid jaw 21 FIGS. 1 and 2. The vernier rod 20 is calibrated in quarter inch increments. Slidable on vernier rod 20 is a horizontal spacer 22 which can be positioned along the vernier rod 20 and fastened by screw 23, FIG. 13. The horizontal spacer's length is equal to the inner width of a given joist or truss hanger and is interchangeable depending on joist and truss hanger requirements. At the upper end of vernier rod 20 is a movable jaw 24 FIGS. 3 and 4. Movable jaw 24 is movable along the vernier rod 20 and can be clamped in desired position by screw 25 FIG. 9 when knurled nut 26 FIG. 7 is tightened.

BRIEF DESCRIPTION OF THE DRAWINGS

FIG. 1 is the top view of the solid jaw of the invention.

FIG. 2 is a sectional view through lines 3—3 of FIG. 1.

FIG. 3 is the top view of the movable jaw of the invention.

FIG. 4 is a sectional view through lines 4—4 of FIG. 3.

FIG. 5 is the top view of the vernier rod of the invention.

FIG. 6 is a sectional view through lines 5—5 of FIG. 5.

FIG. 7 is the end view of the movable jaw knurled nut of the invention.

FIG. 8 is a sectional view through lines 6—6 of FIG. 7.

FIG. 9 is the side view of the movable jaw hexagonal housing screw of the invention.

FIG. 10 is the top view of the horizontal spacer of the invention.

FIG. 11 is a sectional view through lines 7—7 of FIG. 10.

DESCRIPTION OF PREFERRED EMBODIMENT

Figure 12:
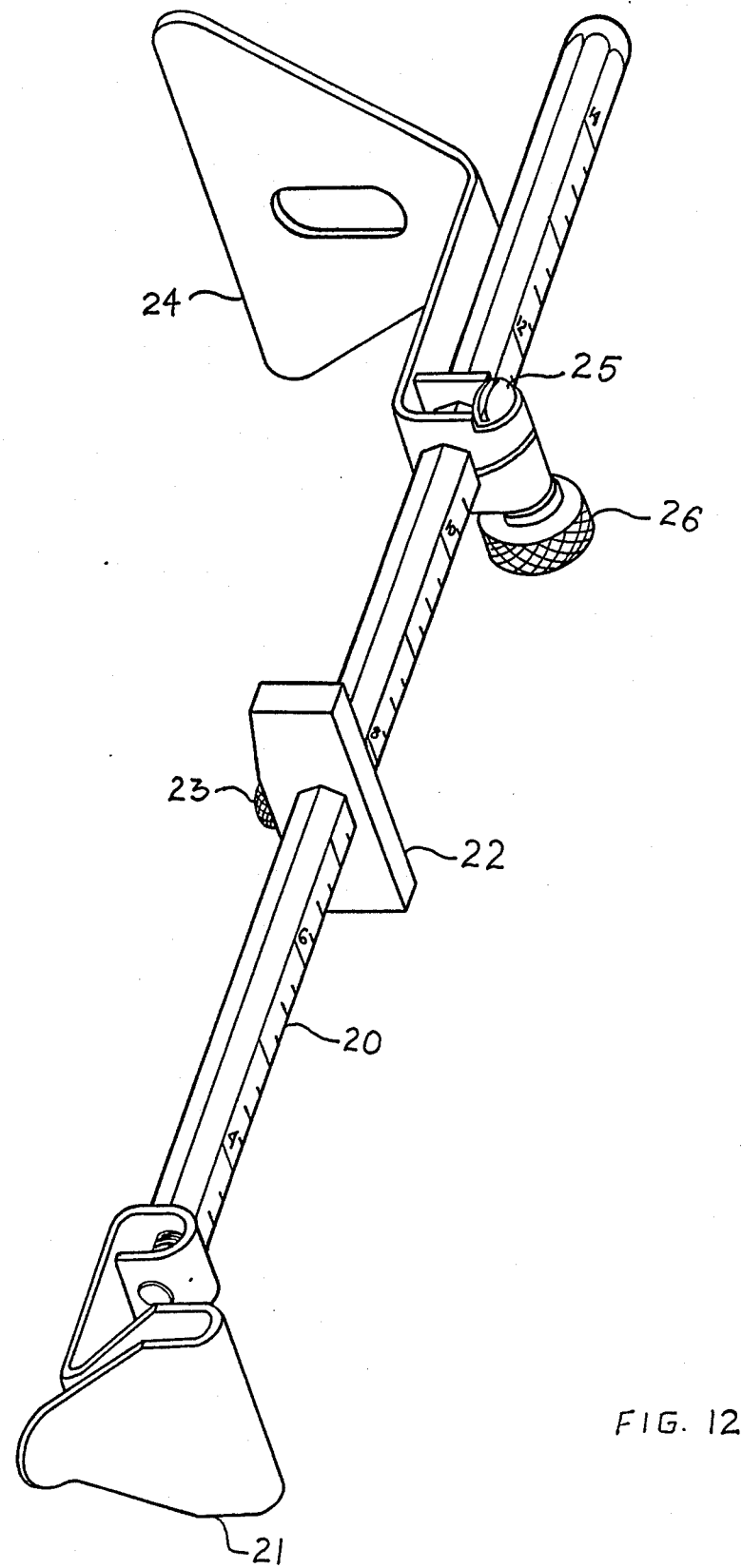
FIG. 12 is a perspective assembly drawing of the invention.

FIG. 1 shows the top view of a solid jaw 21 which serves a dual purpose. The solid jaw 21 holds the joist or truss hanger firmly once inserted between the upper and lower spring-like radial loop member 21. The upper-most part of the solid jaw 21 is threaded for self fastening to the bottom part of the vernier rod 20. The vernier rod 20 is graduated/calibrated in increments of one quarter of an inch through its entire length with major dimensions identified per joist or truss standard height sizes of 4, 6, 8, 10, 12, and 14 inches. The top of the vernier rod 20 is fully rounded for ease of insertion of the horizontal spacer 22 and movable jaw 24.

The purpose of horizontal spacer 22 is to gage/space joist or truss hanger's vertical members apart equidistantly. Horizontal gaging can be accomplished by a simple hand squeeze of the lower end of the two vertical members of the joist or truss hanger until physical contact is made with the spacer 22. The spacer's 22 fixed width size equals the inner width of a given joist or truss hanger and is interchangeable with similar geometrically designed but invariably different width size spacers to accommodate varied joist or truss hanger size requirements. Once the spacer 22 is selected and positioned to a predetermined location on the vernier rod 20, it can be locked by tightening screw 23 against the back surface of the vernier rod 20.

Movable jaw 24 can slide over the vernier rod 20 and can be locked in desired dimensional position, usually equal to that of the joist or truss actual rather than nominal height, by tightening knurled nut 26 over the screw 25 as shown in FIG. 12. Once the horizontal spacer 22 and movable jaw 24 are set in desired positions its resetting will be dictated by the dimensional change of the joist height.

Loading of the joist or truss hanger can be conveniently done by taking hold of the vernier rod 20 with one hand and inserting the bottom of the joist or truss hanger into the solid jaw spring type radial loop opening with the other hand. After insertion has been completed, position the joist or truss hanger with the joist hanger gaging and holding device FIG. 12 onto the header at the desired location as follows: The extended part of movable jaw 24 is to be set on the header's top edge if the header is in structural assembly form. If the header is not assembled structurally, lay the invention down horizontally with the extended part of the movable jaw 24 against the header's top edge. In either case after the positioning is done the gage user's hand can release the entire unit completely and proceed with other job related tasks including the nailing of the joist or truss hanger to the header utilizing one hand only if so desired.

Removal of the joist hanger gage and holding device is accomplished by taking hold of the solid jaw 21 and pulling it away from the joist hanger. The purpose of the hollow feature as shown in FIGS. 1 and 2 through the top member of the solid jaw 21 is to prevent the gage user's hand from slipping during the gage removal process. An alternate way to remove the gage and joist hanger holding device is to take hold of the vernier rod 20 with one hand at any convenient part of its length and pull it away. Subsequent loading and unloading of the joist or truss hangers is subject to repetition of the aforementioned steps.

FIG. 12 presents the preferred embodiment as assembled. The bottom solid jaw 21 and the top movable jaw 24 with their respective members are made out of high strength low alloy powder coated steel. The vernier rod 20 is made out of brass while the horizontal spacer 22 is made out of aluminum with its surface black anodized.

Figure 13:
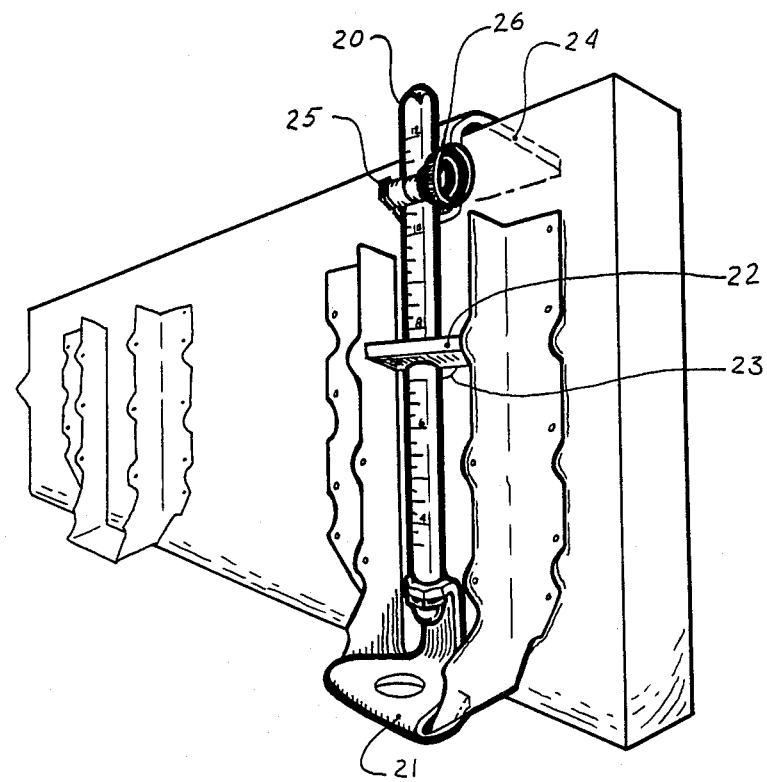
FIG. 13 is a perspective view of the embodiment shown in FIG. 12 as utilized with the joist hanger and a joist.

FIG. 13 presents the preferred embodiment as assembled and as utilized on the joist hanger, and the joist with the respective member's position in relation to each other.

While the preferred embodiment of the invention has been described, the form of the invention should be considered as illustrative and not as limiting the scope of the following claims.

I claim:

1. A joist hanger gage and holding device for vertically positioning a generally U shaped joist hanger on a joist comprising: a linear vernier rod; a fixed lower jaw secured to one of the rod and having a U shape at a right angle to the rod; and an upper jaw member sliding connected to the rod and generally disposed at a right angle to the rod, whereby the lower jaw member embraces the lower end of the U shaped joist hanger and the upper jaw engages the top of the joist to which the hanger is to be secured.

2. A joist hanger gage and holding device as set forth in claim 1 wherein the upper jaw has means for holding the upper jaw at any selected place on the vernier rod.

3. A joist hanger gage and holding device as set forth in claim 1 wherein there is disposed on the vernier rod a transverse spacer that engages the legs of the U shaped joist hanger to hold the legs in true vertical alignment.

4. A joist hanger and holding device as set forth in claim 1 wherein the vernier rod is calibrated so that the moveable upper jaw may be set at and selected measurement with respect to a joist.

* * * * *